United States Patent
Condrad

(10) Patent No.: US 7,354,470 B2
(45) Date of Patent: Apr. 8, 2008

(54) MULTIPLE RETAINER BRIDGE

(75) Inventor: Keith Condrad, Muskego, WI (US)

(73) Assignee: Filtertek Inc., Hebron, IL (US)

( * ) Notice: Subject to any disclaimer, the term of this patent is extended or adjusted under 35 U.S.C. 154(b) by 14 days.

(21) Appl. No.: 10/884,578

(22) Filed: Jul. 1, 2004

(65) Prior Publication Data

US 2005/0022488 A1  Feb. 3, 2005

Related U.S. Application Data

(60) Provisional application No. 60/484,534, filed on Jul. 2, 2003.

(51) Int. Cl.
    *B01D 39/00* (2006.01)
(52) U.S. Cl. .......... 55/490; 55/502; 55/497; 55/504; 55/521; 55/499; 55/503; 55/385.3; 55/385.1; 55/DIG. 31; 210/435
(58) Field of Classification Search ......... 55/490, 55/502, 497, 504, 521, 385.3, 499, 503, DIG. 31, 55/385.1; 210/435
    See application file for complete search history.

(56) References Cited

U.S. PATENT DOCUMENTS

| | | | | |
|---|---|---|---|---|
| 3,019,854 A | * | 2/1962 | O'Bryant | 55/491 |
| 4,826,598 A | | 5/1989 | Cain | |
| 4,828,694 A | | 5/1989 | Leason | |
| 4,860,470 A | * | 8/1989 | Browne | 40/449 |
| 5,049,274 A | | 9/1991 | Leason et al. | |
| 5,314,625 A | | 5/1994 | Farnelli | |
| 5,599,448 A | * | 2/1997 | Spearman | 210/445 |
| 5,667,545 A | * | 9/1997 | Honda et al. | 55/497 |
| 5,685,985 A | * | 11/1997 | Brown et al. | 210/450 |
| 5,690,712 A | * | 11/1997 | Engel | 55/428 |
| 5,730,766 A | * | 3/1998 | Clements | 55/341.1 |
| 5,730,769 A | * | 3/1998 | Dungs et al. | 55/385.3 |
| 5,800,581 A | * | 9/1998 | Gielink et al. | 55/385.3 |
| 5,853,445 A | * | 12/1998 | Wong et al. | 55/343 |
| 5,876,471 A | * | 3/1999 | Lippert et al. | 55/341.1 |
| 6,044,892 A | * | 4/2000 | Epstein | 160/380 |
| 6,116,861 A | | 9/2000 | Hogan et al. | |
| 6,159,260 A | * | 12/2000 | Hammes | 55/502 |
| 6,652,748 B1 | * | 11/2003 | Choi | 210/232 |
| 2001/0052489 A1 | | 12/2001 | Caiozza | |
| 2005/0023210 A1 | * | 2/2005 | Connor et al. | 210/450 |

FOREIGN PATENT DOCUMENTS

EP   1 493 478 A1   1/2005

OTHER PUBLICATIONS

Kurtz, R. "Moving To The 21st Century," *Transmission Digest* (Dec. 1997).

* cited by examiner

*Primary Examiner*—Duane Smith
*Assistant Examiner*—Minh-Chau T. Pham
(74) *Attorney, Agent, or Firm*—Brinks Hofer Gilson & Lione

(57) ABSTRACT

A multiple retainer bridge device is provided for securing a utility member (e.g., a magnet or bracket) to posts on a housing member (e.g., a filter housing). When assembled, the utility member is staked onto the posts. A single retainer member prevents the utility member from sliding off of the posts. The retainer member has at least two ends. Each end has a recess, and each recess has a securing portion and a receptacle portion. The securing portion is fixed to the posts by, for example, sonic welding. Flash created by the fixing process is confined within the receptacle portion of the recesses.

20 Claims, 2 Drawing Sheets

MULTIPLE RETAINER BRIDGE

This application claims benefit of patent application Ser. No 60/484,534 filed on Jul. 2, 2003

TECHNICAL FIELD

This invention relates to assembly housings, and more particularly, to retainer devices for connecting components to assembly housings.

BACKGROUND INFORMATION

Automatic transmissions used in modem automobiles typically utilize a sump filter to remove debris from transmission fluids. Sump filters generally comprise a filtering medium or media, and a filter housing. The filter housing can be formed of a variety of materials, including steel, aluminum, plastics and combinations thereof. Plastic filter housings in particular present numerous advantages. For example, compared to other filter housings, plastic filter housings weigh less, provide greater design flexibility and performance, and are recyclable. Accordingly, plastic filter housings are often more desirable than many other filter housings.

Various components can be connected to filter housings to improve filter performance. For example, adding one or more magnets to a filter housing greatly increases debris capture, as compared to using only laminated media to filter debris. Magnets remove large amounts of metallic particulates that might otherwise damage the transmission. Magnets are typically spaced apart from the filter housing and staked to posts located on the filter housing. Notably, spacing the magnets apart from the filter housing increases the surface area of the magnets that is available for capturing debris from the transmission fluid. This is because transmission fluid can flow across both the lower and upper surfaces of the magnet.

Magnets are typically connected to the posts by a heat-staking process. This involves sliding a magnet over two or more posts, and then heat-staking an individual retainer cap to each post. The retainer caps prevent the magnet from dislodging from the posts.

The above-described conventional methods of connecting a magnet to the filter housing present several drawbacks. One drawback is that an individual retainer cap must be welded to each post in order to secure the magnet. Separately heat-staking multiple caps increases the overall time required to assemble a filter housing, and therefore the overall cost of each filter housing. Another drawback is that the heat-staking process can create debris, such as flash, which can contaminate the transmission fluid. Yet another drawback is that the retainer caps can break off and allow the magnet to separate from the posts, thereby possibly occluding the inlet to the filter housing.

BRIEF SUMMARY OF THE INVENTION

Accordingly, it is an object of the present invention to provide a retainer device having features that resolve or improve upon one or more of the above-described drawbacks.

According to a first aspect of the present invention, the foregoing object is obtained by providing a retainer device for securing a utility member (e.g., a magnet or bracket) to posts on a housing member (e.g., a filter housing). The utility member is staked onto the posts, and a single retainer member prevents the utility member from sliding off of the posts. The retainer member has at least two ends and an elongate portion therebetween. Each end has a recess, and each recess has both a securing portion and a receptacle portion. The securing portion is fixed to the posts by, for example, sonic welding. Any flash created by the fixing process is confined to the receptacle portion of the recesses. The elongate portion between the two ends forms a bridge.

Still other objects and features of the present invention will become readily apparent to those skilled in this art from the following detailed description in conjunction with the accompanying drawings.

DETAILED DESCRIPTION

Figure 1:
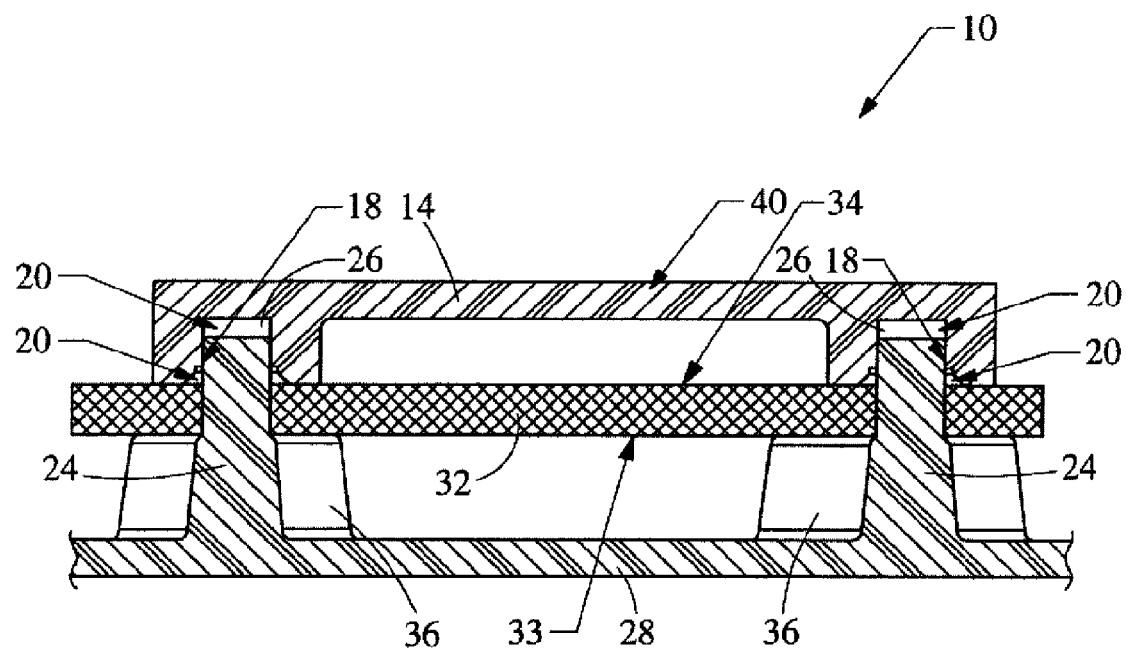
FIG. 1 is a sectional side view of one embodiment of the present invention.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly.

Figure 2:
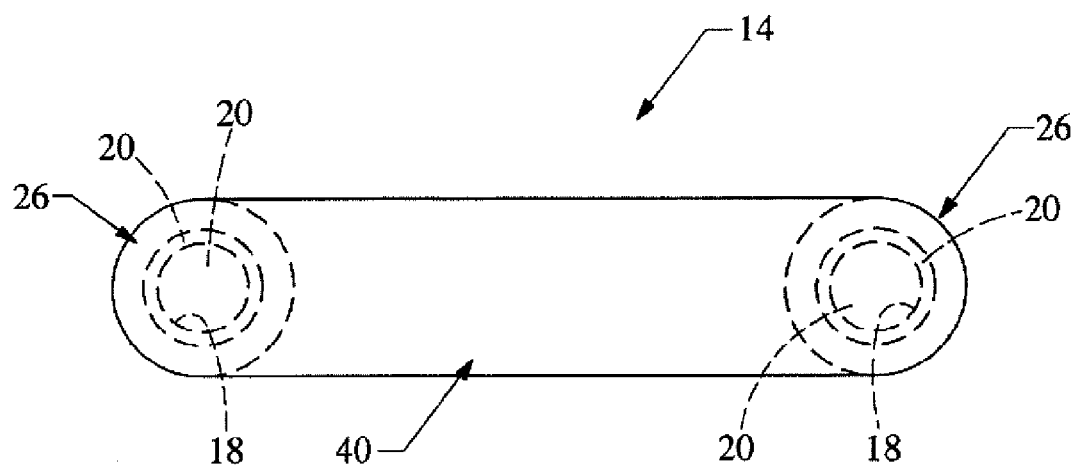
FIG. 2 is a top plan view of one embodiment of a retaining member of the present invention.
Figure 3:
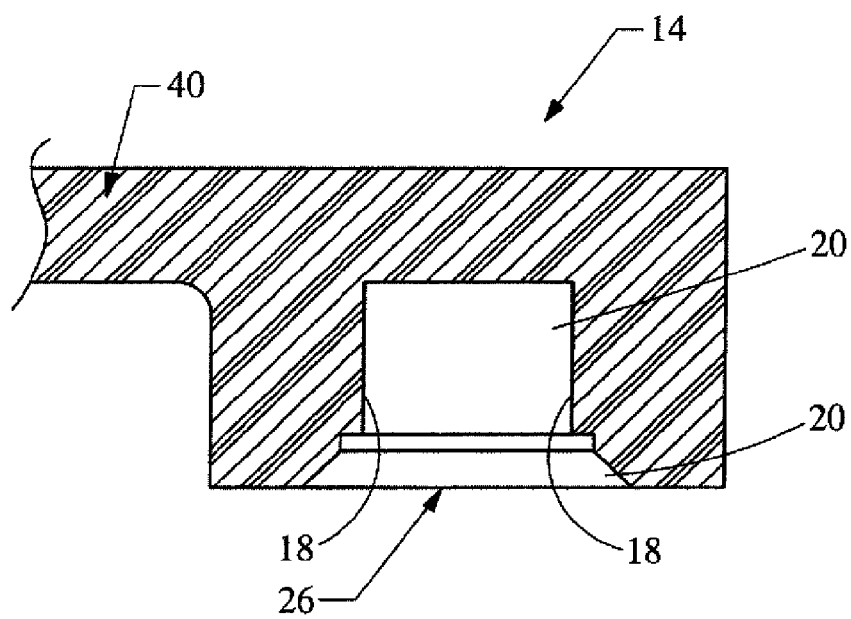
FIG. 3 is a sectional view of one end of the retaining member.

Referring to the drawings, FIGS. 1-3 depict an illustrative embodiment of the present invention, and in particular, retaining device 10. As best illustrated in FIG. 1, retaining device 10 generally comprises retaining member 14, utility member 32, and filter housing 28 having posts 24. The retaining member is configured to secure the utility member to the filter housing. More specifically, the utility member is staked to the posts, and the retaining member is then fixed to the terminal ends of the posts, thereby preventing the utility member from dislodging from the posts. The retaining member is fixed to the posts using a fixing process such as sonic welding.

Referring to FIG. 1, retaining member 14 is an elongate, unitary member. Retaining member 14 preferably is formed of 33% glass nylon, but other materials having similar mechanical characteristics can also be used. Retaining member 14 has two recesses 26. Each recess has a securing portion 18, which is sized to couple with a post. Posts 24 have a circular cross-section. Securing portions 18 form substantially right cylinders that firmly couple or mate with posts 24. Other mating or coupling configurations can also be used, such as box-shaped securing portions and posts having a square cross-section.

In addition to securing portions, retaining member 14 is provided with receptacles 20, as best illustrated in FIG. 3. Receptacles 20 are located adjacent to the securing portions. As illustrated in FIG. 1, when retaining member 14 is coupled to posts 24, receptacles 20 abut the upper surface 34 of utility member 32. Optionally, additional receptacles can be provided above posts 24 (see FIG. 1). As a result, receptacles 20 capture debris, such as flash created as the retaining member 14 is coupled with or welded to the posts. The receptacles, therefore, prevent debris from contaminating the transmission fluid.

Figure 4:
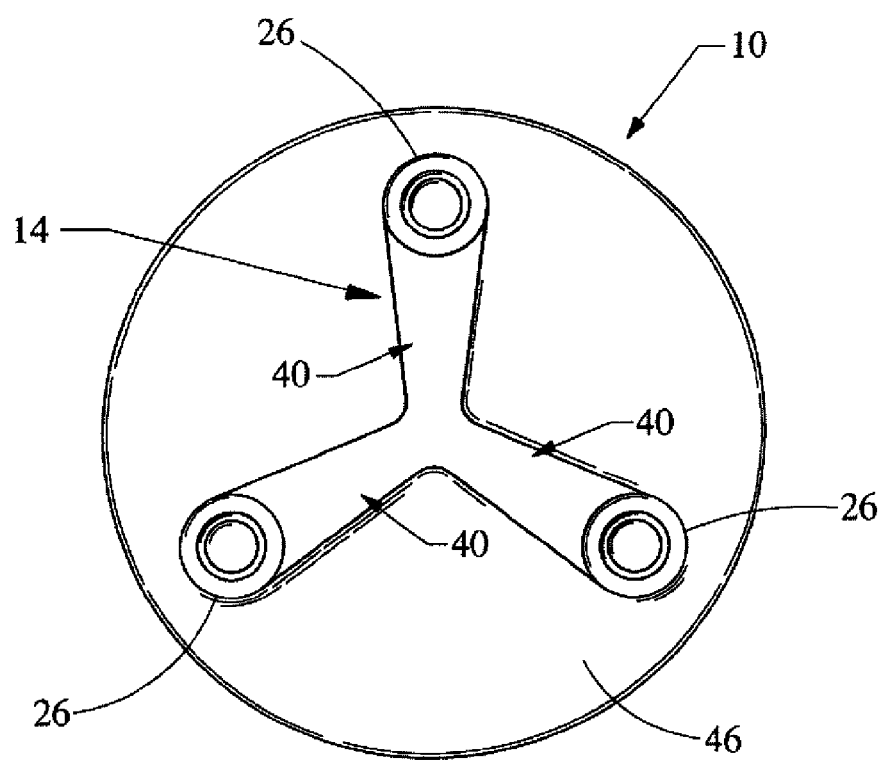
FIG. 4 is a top plan view of another embodiment of a retaining member and magnet of the present invention.

Retaining member 14 also forms an arch or bridge 40. As best illustrated in FIGS. 2-3, bridge 40 extends between recesses 26. The bridge provides for a unitary retaining member structure while allowing transmission fluid to flow across upper portion 34 of utility element 32. Alternatively, the retaining member can be shaped differently, depending on the quantity and location of the posts. For example, if the filter housing has three posts, the bridge can be "T-shaped," triangular, annular, or triskelion-shaped as illustrated in FIG. 4.

Various desirable instruments can function as a utility member, for example, a metal plate, a bracket, or a magnet. As illustrated in FIG. 1, the utility member is a substantially flat, rectangular magnet 32 having an upper surface 34 and a lower surface 33. Magnet 32 is about 60 mm long and about 30 mm wide. Additionally, magnet 32 has two holes configured to receive posts 24. The holes are spaced apart to coincide with the corresponding location of the posts. Preferably, both the holes and the posts are spaced apart by about 22 mm. Of course, additional holes can be provided in the magnet to correspond with any additional posts.

The posts may be either molded, welded, or otherwise fixed directly to the filter housing using conventional methods. As illustrated in FIG. 1, posts 24 each comprise a terminal end and a fin 36. As noted above, the terminal ends of posts 24 have a round cross-section that is configured to mate or couple with recesses 18. Posts 24 are also provided with fins 36. Fins 36 stabilize and maintain magnet 32 spaced apart from filter housing 28. Additionally, fins 36 direct the flow of transmission fluid towards the filter housing inlet (not shown).

To connect the utility member to the filter housing, the utility member is staked onto the corresponding posts. The securing portion of the retaining member is subsequently fitted over the terminal ends of the posts. The securing portion of the retaining member is then welded to the posts. The retaining member and the posts are preferably sonically welded, although other conventional fixing processes can be used. For example, the retaining member and the posts can be glued together, or heat welded. In a preferred embodiment, a magnet is separately fixed to the filter housing using a single retaining member. Alternatively, two magnets can be fixed separately to the filter housing by using one retaining member to retain both magnets. For example, if two magnets are separately staked onto four posts, a single retaining member can be fixed to the four posts, thereby simultaneously securing both magnets to the filter housing.

As illustrated in FIG. 4, in another alternative embodiment, a triskelion-shaped retaining member is used to retain a discords magnet. In particular, discords magnet 46 is staked onto three posts (not shown). Recesses 26 are then mated with and sonically welded to the three posts. Other magnet shapes and retainer configurations will become apparent to one of skill in the art.

The embodiments described above and shown herein are illustrative and not restrictive. The scope of the invention is indicated by the claims rather than by the foregoing description and attached drawings. The invention can be embodied in other specific forms without departing from the spirit of the invention. For example, the retaining member can be used to fasten a utility element to non-filter assemblies. In addition, the shape and construction of the retaining device, and in particular, the retaining member could be varied while still achieving the preferred functionality. In another alternative, fins can be spaced apart from the posts. In yet another alternative, slide-stops rather than fins can protrude from the posts, thereby preventing the utility element from sliding into direct contact with or abutting the filter housing. Accordingly, these and other changes that come within the scope of the claims are intended to be embraced herein.

The invention claimed is:

1. A device for securing a utility member to a housing member, the device comprising:
    an elongate retaining member having at least two chambers, the chambers comprising a securing portion and a receptacle; and
    at least two posts each comprising a first end connected to the housing member, the at least two posts corresponding with the at least two chambers, each of the at least two posts further comprising a second end secured to the corresponding securing portion, wherein the receptacle defines an enclosed volume adjacent to the second end for capturing debris, wherein the utility member is secured between the housing member and the elongate retaining member, and further wherein the at least two posts extend through the utility member.

2. The device of claim 1, wherein the utility member is a magnet.

3. The device of claim 2, wherein the housing member is configured to house an automotive filter.

4. The device of claim 3, wherein the housing member is formed from plastic.

5. The device of claim 1, wherein the at least two posts are welded to the securing portion.

6. The device of claim 5, further comprising a flash material formed adjacent to an end of the post, wherein the receptacle is configured to receive the flash material.

7. The device of claim 6, wherein the at least two posts are sonically welded to the securing portion.

8. The device of claim 1, wherein the elongate retaining member is upwardly convex.

9. The device of claim 8, wherein the elongate retaining member is obround and wherein the at least two chambers are campanulate.

10. The device of claim 1, wherein the securing portion forms a right cylinder and the receptacle is infundibular.

11. The device of claim 1, wherein the elongate retaining member is formed of glass-filled nylon.

12. The device of claim 1, further comprising a protrusion for spacing the utility member apart from the housing member.

13. The device of claim 12, wherein the protrusion is a fin.

14. The device of claim 1, wherein the utility member forms a bracket.

15. An automotive filter, comprising:
    a filter housing comprising an interior volume;
    a plurality of posts connected to the filter housing and projecting into the interior volume;
    a magnet disposed within the interior volume of the housing and connected to the plurality of posts, the plurality of posts extending through the magnet, the magnet being spaced apart from housing; and
    a means for securing the magnet to the plurality of posts comprising a retaining member having a plurality of receptacles configured for attachment to each of said posts and defining an enclosed volume adjacent to an end of each of said posts for capturing debris.

16. The automotive filter of claim 15, wherein the means for securing the magnet to the plurality of posts is sonically welded to the plurality of posts.

17. The automotive filter of claim 15, wherein the magnet is discords.

18. A utility device, comprising:

an automotive filter assembly:

a plurality of posts connected to the automotive filter assembly, the plurality of posts each having a first end portion connected to a wall of the automotive filter assembly and a second end portion projecting into an interior volume of the automotive filter assembly;

a magnet connected to the plurality of posts, the second end portion of each of the plurality of posts extending through the magnet; and a member having a plurality of ends corresponding with the plurality of posts, the member comprising a securing portion and a receptacle adjacent the securing portion, wherein the member is configured to retain the magnet to the second end portion of each of the plurality of posts, and further wherein the receptacle is configured to enclose an interior volume adjacent the second end portion of each of the plurality of posts for capturing debris.

19. The utility device of claim 18, wherein the automotive filter assembly is plastic.

20. The utility device of claim 18, wherein the magnet is discords, and wherein the member is triskelion.

* * * * *

UNITED STATES PATENT AND TRADEMARK OFFICE
CERTIFICATE OF CORRECTION

PATENT NO. : 7,354,470 B2 Page 1 of 1
APPLICATION NO. : 10/884578
DATED : April 8, 2008
INVENTOR(S) : Keith Condrad It is certified that error appears in the above-identified patent and that said Letters Patent is hereby corrected as shown below:

Column 5, in claim 17, line 2, delete "discords" and substitute --discoid-- in its place.

Column 5, in claim 18, line 2, immediately after "filter assembly" delete ":" (colon) and substitute --;-- (semicolon).

Column 6, in claim 20, line 2, delete "discords" and substitute --discoid-- in its place.

Signed and Sealed this

Sixteenth Day of September, 2008

JON W. DUDAS
*Director of the United States Patent and Trademark Office*